US009211639B2

(12) United States Patent
Hecht et al.

(10) Patent No.: US 9,211,639 B2
(45) Date of Patent: Dec. 15, 2015

(54) HAND-HELD POWER TOOL

(75) Inventors: Joachim Hecht, Magstadt (DE); Heiko Roehm, Stuttgart (DE); Tobias Herr, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1018 days.

(21) Appl. No.: 13/381,738

(22) PCT Filed: Jun. 1, 2010

(86) PCT No.: PCT/EP2010/057654
§ 371 (c)(1), (2), (4) Date: May 29, 2012

(87) PCT Pub. No.: WO2011/000653
PCT Pub. Date: Jan. 6, 2011

(65) Prior Publication Data

US 2012/0097408 A1 Apr. 26, 2012

(30) Foreign Application Priority Data

Jul. 3, 2009 (DE) ........................ 10 2009 027 444

(51) Int. Cl.
*B23B 45/16* (2006.01)
*B25D 11/06* (2006.01)
*B25D 16/00* (2006.01)
*B25D 17/06* (2006.01)

(52) U.S. Cl.
CPC ............ *B25D 11/062* (2013.01); *B25D 16/003* (2013.01); *B25D 17/06* (2013.01); *B25D 2217/0015* (2013.01); *B25D 2250/085* (2013.01); *B25D 2250/165* (2013.01); *B25D 2250/205* (2013.01); *B25D 2250/245* (2013.01); *B25D 2250/361* (2013.01)

(58) Field of Classification Search
None
See application file for complete search history.

(56) References Cited

U.S. PATENT DOCUMENTS

| | | | | |
|---|---|---|---|---|
| RE33,733 | E * | 11/1991 | Hendrikx et al. | 173/109 |
| 6,223,833 | B1 * | 5/2001 | Thurler et al. | 173/48 |
| 6,457,535 | B1 * | 10/2002 | Tanaka | 173/48 |
| 2003/0143042 | A1 * | 7/2003 | Doyle et al. | 408/124 |
| 2004/0231866 | A1 * | 11/2004 | Droste | 173/48 |

(Continued)

FOREIGN PATENT DOCUMENTS

| | | |
|---|---|---|
| CN | 1285446 | 2/2001 |
| CN | 1864936 | 11/2006 |

(Continued)

OTHER PUBLICATIONS

Effects of Planetary Gear Ration on Mean Service Life; Army Research Laboratory Technical Report ARL-TR-1150 M. Savage et al. Presented at the Seventh International Power Transmission and Gearing Conference sponsored by the American Society of Mechanical Engineers; Oct. 6-9, 1996.*

(Continued)

*Primary Examiner* — Michelle Lopez
*Assistant Examiner* — Chinyere Rushing-Tucker
(74) *Attorney, Agent, or Firm* — Kenyon & Kenyon LLP

(57) ABSTRACT

In a hand-held power tool, in particular an impact drill driver, having a torque setting unit, a gearbox assemblage, a hammer impact mechanism, and a tool spindle, the hammer impact mechanism has a drive rotation element having a rotation axis that is disposed coaxially with at least a part of the tool spindle.

19 Claims, 6 Drawing Sheets

(56) References Cited

U.S. PATENT DOCUMENTS

| | | | | |
|---|---|---|---|---|
| 2005/0028995 | A1* | 2/2005 | Saito et al. | 173/176 |
| 2006/0207776 | A1* | 9/2006 | Hahn et al. | 173/49 |
| 2009/0126957 | A1* | 5/2009 | Schroeder et al. | 173/48 |

FOREIGN PATENT DOCUMENTS

| | | | |
|---|---|---|---|
| DE | 3611890 | | 10/1987 |
| DE | 102006061600 | | 7/2008 |
| DE | 102006061600 | A1 * | 7/2008 |
| EP | 0129865 | | 1/1985 |
| EP | 1 690 643 | | 8/2006 |
| EP | 1695796 | | 8/2006 |
| GB | 2295347 | | 5/1996 |
| WO | WO 93/00201 | | 1/1993 |

OTHER PUBLICATIONS

International Search Report, PCT International Application No. PCT/EP2010/057654, dated Jul. 21, 2010.

* cited by examiner

HAND-HELD POWER TOOL

FIELD OF THE INVENTION

The present invention relates to a hand-held power tool.

BACKGROUND INFORMATION

Certain hand-held power tools, in particular an impact drill driver, having a torque setting unit, a gearbox assemblage, a hammer impact mechanism, and a tool spindle, are conventional.

SUMMARY

Example embodiments of the invention relate to hand-held power tools, in particular an impact drill driver, having a torque setting unit, a gearbox assemblage, a hammer impact mechanism, and a tool spindle.

It is provided that the hammer impact mechanism has a drive rotation element having a rotation axis that is disposed coaxially with at least a part of the tool spindle. A "torque setting unit" is to be understood in particular as a unit having a clutch apparatus, which is provided for limiting, in at least one operating state, a maximum torque transferred via the tool spindle. The clutch apparatus is advantageously releasable. The "maximum torque" is preferably a torque that the tool spindle can transfer to an inserted tool during operation, in particular before a clutch apparatus automatically opens. The clutch apparatus is preferably arranged as an apparatus having spring-mounted or spring-loaded latching elements such as, in particular, balls. Other apparatuses may also be provided. The latching elements can be loaded with a spring force in an axial and/or preferably in a radial direction. A "gearbox assemblage" is to be understood in particular as an assemblage that has at least one gear stage. The gear stage is advantageously arranged as a right-angle gearbox, as a bevel gear gearbox, and/or as another gear stage. The gear stage is arranged particularly advantageously as a planet wheel gear stage. A "hammer impact mechanism" is to be understood in particular as an impact mechanism having at least one linearly moved striker. Advantageously, the hammer impact mechanism moves the striker resiliently and/or pneumatically and/or hydraulically by a gate apparatus, by a wobble bearing, and/or advantageously by an eccentric element. The hammer impact mechanism is thus arranged preferably as a slide impact mechanism, as a wobble bearing impact mechanism, and/or as an eccentric impact mechanism. A "gate impact mechanism" is to be understood in particular as a hammer impact mechanism having a gate apparatus. A gate apparatus generates a linear motion between at least two regions by elements that are movable on a mechanically delimited endless track. A "wobble bearing impact mechanism" is to be understood in particular as a bearing having a finger, which is connected to the drive rotation element and whose bearing plane deviates from a plane that is oriented perpendicular to the rotation axis of the drive rotation element. An "eccentric impact mechanism" is to be understood in particular as a hammer impact mechanism which is provided in order to generate, from a rotary motion, a linear motion perpendicular to the rotation axis of the rotary motion. The eccentric impact mechanism preferably has an eccentric element that is connected nonrotatably to the drive rotation element. A "hammer impact mechanism" is in particular to be understood as a ratchet impact mechanism in which a ratchet disk rotatable in an axial direction is uninterruptedly connected fixedly to the hand-held tool housing, and in which in order to generate a pulse, the ratchet disk coacts with a ratchet disk uninterruptedly mechanically connected to the tool spindle. A "ratchet impact mechanism" is, in particular, an impact mechanism in which an impact-generating ratchet disk is rotationally drivable, in which context an axial tooth set of the ratchet disk causes an axial motion of the tool spindle. A "tool spindle" is to be understood in particular as a shaft of the hand-held power tool that, in at least one operating state, transfers a rotary motion to a tool mounting apparatus of the hand-held power tool. A rotation axis of the tool spindle is preferably located on a rotation axis of an inserted tool and/or of the tool mounting apparatus. Particularly advantageously, in at least one operating state the tool spindle transfers a rotary motion and an impact motion to the tool mounting apparatus. Particularly advantageously, at least a part of the tool spindle is connected directly to the tool mounting apparatus. The tool spindle preferably has a mount for the tool mounting apparatus. Alternatively, the tool spindle can be arranged at least partly integrally with the tool mounting apparatus. A "drive rotation element" is to be understood in particular as an element that executes a rotary motion in at least one operating state, and that moves at least one further element of the hammer impact mechanism. Advantageously, the drive rotation element is arranged as a shaft, particularly advantageously as a hollow shaft. The term "coaxially" is to be understood in particular to mean that in at least one operating state, at least a part of the tool spindle and the drive rotation element are driven rotationally around a common rotation axis. Preferably, at least a part of the tool spindle and the drive rotation element are rotatable relative to one another around the same rotation axis. Particularly advantageously, the hand-held power tool is arranged without countershafts. "Without countershafts" is to be understood in particular to mean that all the shafts of the hand-held power tool that, at least in a drilling mode, transfer a rotary motion, have a common rotation axis that advantageously coincides with the rotation axis of the tool spindle. "At least a part of the tool spindle" is to be understood in particular as a region of the tool spindle that is connected directly to the tool mounting apparatus. Alternatively and/or additionally, "at least a part of the tool spindle" is to be understood as a region of the tool spindle that is connected directly to the gearbox assemblage. The tool mounting apparatus is advantageously arranged as a tool chuck, as a hex receptacle, as an SDS receptacle (Special Direct System of Robert Bosch GmbH), and/or as another tool mounting apparatus. "Provided" is to be understood in particular to mean specially equipped and/or designed.

As a result of the configuration according to example embodiments of the present invention of the hand-held power tool, a particularly compact and, in particular, short configuration can be achieved. The hand-held power tool achieves in this context a particularly high level of individual impact energy, which advantageously results in particularly good drilling progress.

In example embodiments, it is provided that the drive rotation element be arranged as an impact mechanism shaft that encases at least a region of the tool spindle. An "impact mechanism shaft" is to be understood in particular as a shaft that transfers a rotary motion to at least one further element of the hammer impact mechanism in order to generate an impact. Particularly advantageously, the tool spindle and the impact mechanism shaft rotate, in at least one operating state, at a different angular speed. The term "encase" is to be understood in particular to mean that the impact mechanism shaft surrounds the tool spindle to a very large extent, advantageously over 360°, in at least one plane. Advantageously, this plane is oriented perpendicular to the rotation axis of the drive rotation element. As a result of a corresponding configuration, a particularly space-saving design can be achieved, and the impact mechanism shaft encasing the tool spindle can be implemented with a low tool spindle mass and a small tool spindle diameter.

It may further be provided that the hammer impact mechanism have an eccentric element, with the result that a capable and mechanically low-wear hand-held power tool can be made available with a simple design.

It may moreover be provided that the eccentric element have a rotation axis that coincides with a rotation axis of the tool spindle. The term "coincide" is to be understood in particular to mean that the eccentric element is supported rotationally drivably around a rotation axis identical to that of the tool spindle. Preferably, the eccentric element and at least a part of the tool spindle are connected nonrotatably to one another. As a result, it is advantageously possible to dispense with a countershaft, and a particularly handy and lightweight hand-held power tool can be achieved. In particular, a capable hand-held power tool having a weight (including a battery unit) of less than 5 kg, advantageously less than 2 kg, particularly advantageously less than 1.5 kg can be achieved.

In example embodiments, it is provided that the hammer impact mechanism have a resilient lever element, supported pivotably around a pivot axis, which is provided in order to drive a striker of the hammer impact mechanism in at least one operating state. A "lever element" is to be understood in particular as a movable element on which at least two torques act at a distance, advantageously at a different distance, from the pivot axis. The lever element is preferably pivotable around a pivot axis that is oriented perpendicular to the rotation axis of the tool spindle. Particularly advantageously, the lever element is configured rotationally asymmetrically and/or movably less than 360° around a rotation axis. The term "resilient" is to be understood in particular to mean that at least one point of the lever element is deflected at least 1 mm relative to another point of the lever element during an operating state. Advantageously, the lever element is made at least partly of spring steel. The term "drive" is to be understood in particular in accelerating fashion. As a result of the lever element, an effective and economical hammer impact mechanism can be implemented with a simple design.

In example embodiments, it is provided that the hammer impact mechanism have a striker that, in at least one operating state, is freely movable in a principal working direction. The striker is preferably movable by the lever element. "Freely movable" is to be understood in this connection to mean in particular that the striker is decoupled from components, except for a sliding and/or rolling friction in a guide, over at least one travel segment in the principal working direction. A "principal working direction" is to be understood in particular as an impact pulse direction of the hammer impact mechanism. As a result of the striker that is freely movable in at least one operating state, particularly high impact energy along with convenient and, in particular, low-vibration operation can be achieved.

It is further provided that the tool spindle have a rotary entrainment contour which is provided for creating an axially displaceable and nonrotatable connection along a rotation axis. The rotary entrainment contour transfers advantageously principally, particularly advantageously exclusively, rotational forces. The rotary entrainment contour is arranged as a rotary entrainment contour, such as in particular a spline shaft profile and/or advantageously such as a tooth set. Particularly advantageously, the tool spindle is arranged in two parts and the rotary entrainment contour connects the two parts of the tool spindle to one another. As a result of the rotary entrainment contour, advantageously, a ratio between the striker mass and spindle mass can be optimally selected and the tool spindle can be axially decoupled from the gearbox assemblage so that wear, in particular on a planet carrier of the gearbox assemblage, can be minimized.

It is further provided that the gearbox assemblage have at least one sun gear that, in at least one operating state, is connected nonrotatably, in particular directly (i.e. without further interposed components) nonrotatably to the drive rotation element, thereby making possible a particularly simple design that saves installation space.

Also provided are an electric motor and a battery connector unit which is provided for supplying the electric motor with energy. For this purpose, the battery connector unit is preferably connected, in a ready-to-operate operating state, to a battery unit. A "battery connector unit" is to be understood in particular as a unit which is provided in order to create a contact with the battery unit. Advantageously, the battery connector unit creates an electrical and a mechanical contact. A "battery unit" is to be understood in particular as an apparatus having at least one storage battery, which apparatus is provided in order to supply the hand-held power tool with energy independently of a power grid. A particularly convenient hand-held power tool that is usable independently of a power network can thereby be implemented. Alternatively, the hand-held power tool is also operable with a different motor such as, in particular, an electric motor having a power connector, or a compressed-air motor.

It is furthermore provided that the gearbox assemblage have a gear stage that is arranged as a planet wheel gear stage. The planet wheel gear stage has at least one sun gear, a ring gear, at least one planet wheel, and/or a planet carrier. As a result of the planet wheel gear stage, an advantageous reduction ratio can be achieved in particularly space-saving fashion.

It is moreover provided that the hammer impact mechanism have a releasable, in particular mechanically releasable clutch apparatus which is provided in order to transfer a rotary motion. Preferably, the clutch apparatus nonrotatably connects the impact mechanism shaft of the hammer impact mechanism and at least a part of the gearbox assemblage in at least one operating state. A "releasable clutch apparatus" is to be understood in particular as a clutch apparatus that in at least one operating state transfers a rotary motion, and in at least one operating state interrupts a transfer of the rotary motion. "Transferring a rotary motion" is to be understood as conveying in particular a rotation speed and/or a torque. As a result of the releasable clutch apparatus, the hammer impact mechanism can advantageously be disengaged, thus resulting in a hand-held power tool that is advantageously usable as a screwdriver.

It is further provided that the clutch apparatus be provided in order to be closed by a force transferred via the tool spindle. The clutch apparatus is preferably provided in order to be closed by a force acting in an axial direction of the tool spindle. As a result of the clutch apparatus closable via the tool spindle, the hammer impact mechanism can, advantageously, automatically be engaged in the context of a drilling procedure and disengaged at idle, making possible low wear and convenient operation.

It is further provided that the hand-held power tool have an operating element by which the clutch apparatus can be actuated. Advantageously, at least the operator can actuate the clutch apparatus by the operating element and/or by the tool spindle. Alternatively and/or additionally, a sensor unit and an actuation unit can actuate the clutch apparatus at least partly automatically on the basis of material properties of a workpiece. The clutch apparatus of the torque setting unit and the clutch apparatus of the hammer impact mechanism preferably have one operating element each and/or one common operating element. "Actuation" is to be understood in particular as opening and/or closing of the clutch apparatus, with the result that the impact mode can be conveniently engaged and disengaged by the operator and, in particular, the clutch apparatus of the torque setting unit can be uninterruptedly closed in a drilling mode.

In example embodiments, it is provided that the hammer impact mechanism have a striker that at least partly surrounds the tool spindle in at least one plane. The tool spindle, in this context, advantageously penetrates at least partly through the striker in the direction of the rotation axis of the tool spindle. Particularly advantageously, the tool spindle penetrates entirely through the striker. The striker preferably surrounds the tool spindle over 360° in at least one plane. The phrase "surrounds over 360° in at least one plane" is to be understood in particular to mean that the striker radially encases at least one point of the tool spindle in at least one plane. As a result of the fact that the striker at least partly surrounds the tool spindle, advantageously a tool spindle having a low mass can be achieved, and a particularly lightweight and compact hand-held power tool with a high level of capability can thus be made available.

In example embodiments, it is provided that in at least one operating state, the striker impact the tool spindle. Advantageously, the striker thereby transfers an impact pulse onto at least a part of the tool spindle, the tool spindle advantageously transferring the impact pulse onto a tool mounting apparatus of the hand-held power tool. The tool mounting apparatus preferably transfers the impact pulse onto an inserted tool. Alternatively and/or additionally, the striker impacts an impact transfer apparatus such as a setting head, or directly impacts an inserted tool of the hand-held power tool. The impact transfer apparatus transfers an impact motion directly onto an inserted tool. For this, the impact transfer apparatus is, for example, disposed at least partly coaxially inside the tool spindle. As a result of the fact that the striker impacts the tool spindle directly, the tool spindle can advantageously transfer an impact motion and a rotary motion in combined fashion onto a tool mounting apparatus, with the result that, advantageously, an economical, universally usable tool mounting apparatus of simple design can be used, and installation space can in turn be reduced.

It is further provided that the gearbox assemblage have at least one gear stage element which is provided in order to split a power flow so as to make available different rotation speeds for an impact drive and a rotation drive. A "gear stage element" is to be understood in particular as a sun gear, a ring gear, a planet wheel, another element of the gearbox assemblage, and/or in particular as a planet carrier. "Split" is to be understood in this connection, in particular, to mean that forces that cause torques act on the gear stage element at least three points such as, in particular, at least one input point and at least two output points. As a result, a rotation speed for an impact drive can be optimized to a particularly effective number of impacts, and particularly rapid drilling progress in an impact drilling mode can thus be achieved.

It is further provided that the gearbox assemblage generate, in at least one operating state, at least two output rotary motions that have a non-integer ratio to one another. In at least one operating state, the gearbox assemblage preferably transfers one of the output rotary motions to the tool spindle and one of the output rotary motions to the hammer impact mechanism. A "non-integer ratio" is to be understood in particular as a ratio that lies outside a set of natural numbers. The ratio is preferably outside the set of natural numbers between 2 and 6. An "output rotary motion" is to be understood in particular as a rotary motion that directs a power output out of the gearbox assemblage. As a result of the non-integer ratio between the two output rotary motions, an advantageous impact pattern can be achieved which provides a particularly effective impact drilling mode.

In example embodiments, it is provided that the gearbox assemblage have at least one ring gear that is supported axially movably. "Supported axially movably" is to be understood as, in particular, movably in a direction parallel to a rotation axis of the ring gear. Advantageously, the ring gear is movable with respect to a hand-held power tool housing, with respect to at least one planet wheel of an identical gear stage, and/or with respect to at least one planet wheel of a further gear stage. Particularly advantageously, the ring gear is movable so that it is coupled simultaneously and/or successively with at least one respective planet wheel of two different gear stages. As a result of the axially movably supported ring gear, an overload clutch and/or an impact shutoff system can be implemented with a simple design and economically.

It is furthermore provided that the hand-held power tool have a spring element that, in at least one operating state, exerts a force on the axially movable ring gear, with the result that the ring gear is moved, advantageously automatically, in at least one direction and a configuration of simple design is thus possible.

It is further provided that the gearbox assemblage have at least one gear stage which is provided in order to increase a rotation speed for an impact drive, with the result that an advantageously high number of impacts, and thus an effective impact drilling procedure, can be achieved.

Further advantages are evident from the description below of the drawings. Two exemplifying embodiments are depicted in the drawings. The drawings and the specification contain numerous features in combination. One skilled in the art will appropriately consider the features individually as well, and group them into further combinations.

DETAILED DESCRIPTION

Figure 1:
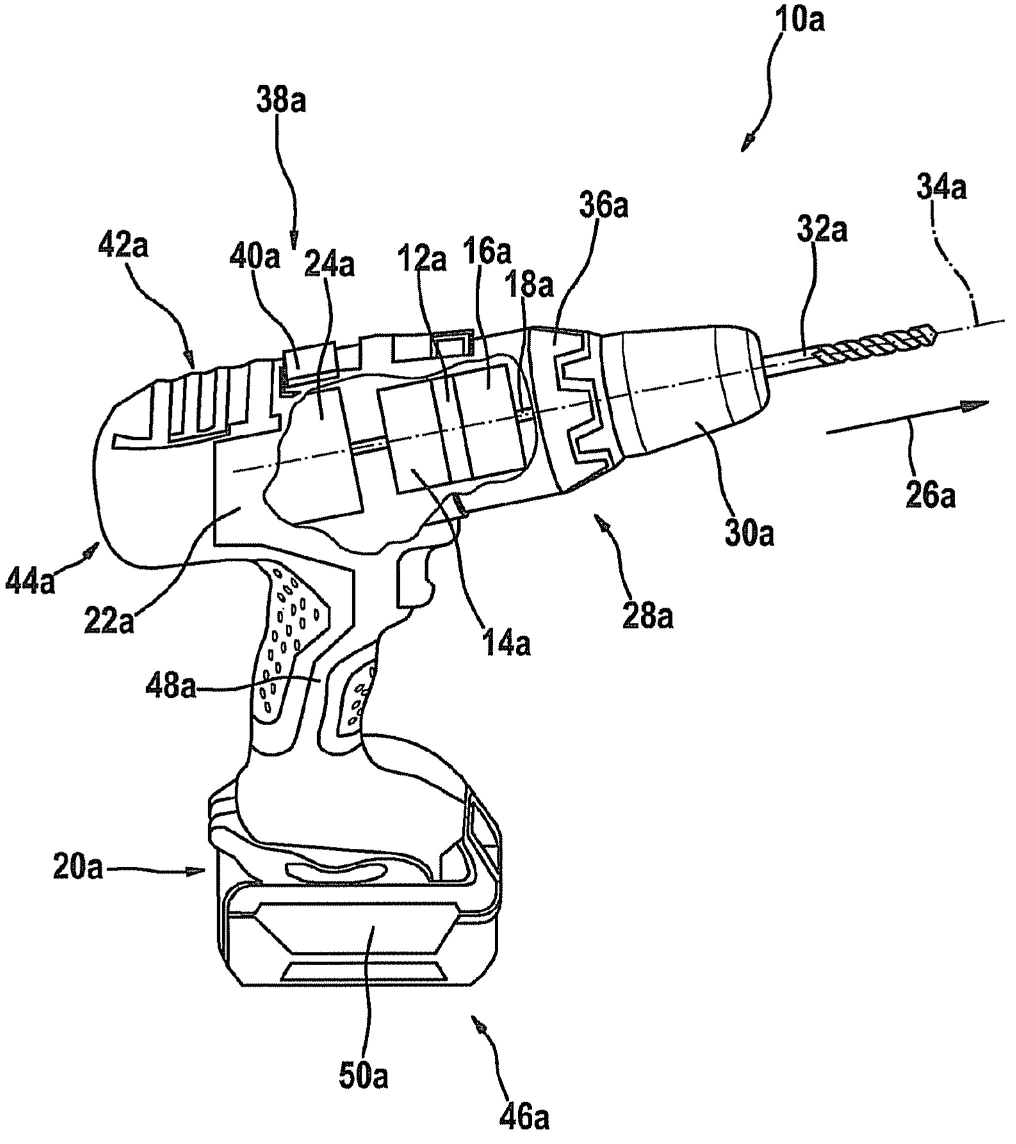
FIG. 1 shows a hand-held power tool according to an example embodiment of the present invention having a schematically depicted drivetrain.

FIG. 1 is a partly schematic depiction of a hand-held power tool **10*a* that is arranged as a cordless impact drill driver. Hand-held power tool 10*a* has a torque setting unit 12*a*, a gearbox assemblage 14*a*, a hammer impact mechanism 16*a*, a tool spindle 18*a*, a battery connector unit 20*a*, a pistol-shaped hand-held power tool housing 22*a*, and an electric motor 24*a* disposed in hand-held power tool housing 22*a*. In a front region 28*a* of hand-held power tool 10*a*, viewed oppositely to a principal working direction 26*a* of hand-held power tool 10_a_, hand-held power tool 10_a_ has a tool mounting apparatus 30_a_ that is arranged as a tool chuck. Mounted in tool mounting apparatus 30_a_ is an inserted tool 32_a_ that, during operation of hand-held power tool 10_a_, rotates around a rotation axis 34_a_ of tool spindle 18_a_ that extends parallel to principal working direction 26_a_. Rotation axis 34_a_ is arranged as a principal rotation axis, i.e. multiple elements of hand-held power tool 10_a_ are rotatable about said rotation axis 34**_a_.

An operating element 36_a_ of torque setting unit 12_a_ is disposed annularly around rotation axis 34_a_ of tool spindle 18_a_, between hand-held power tool housing 22_a_ and tool mounting apparatus 30_a_. Disposed on an upper side 38_a_, i.e. a side facing away from battery connector unit 20_a_, of hand-held power tool 10_a_ is an operating element 40_a_ that enables an operator (not further depicted) to change over between a drilling or screwing mode and a hammer drilling mode.

Electric motor 24_a_ is disposed in a rear region 42_a_, i.e. a region facing away from tool mounting apparatus 30_a_, of hand-held power tool housing 22_a_. A stator (not further depicted) of electric motor 24_a_ is connected nonrotatably to hand-held power tool housing 22_a_. Gearbox assemblage 14_a_ is disposed in a tubular upper region 44_a_, disposed axially with respect to rotation axis 34_a_, of the pistol-shaped hand-held power tool housing 22_a_. A lower region 46_a_ of hand-held power tool housing 22_a_, which adjoins upper region 44_a_ approximately at right angles, forms a handle 48_a_. Battery connector unit 20_a_ is disposed at a lower end of lower region 46_a_. In a ready-to-operate state (as shown), a battery unit 50_a_ is connected to battery connector unit 20_a_. During operation, battery unit 50_a_ supplies electric motor 24_a_ with energy.

Figure 2:
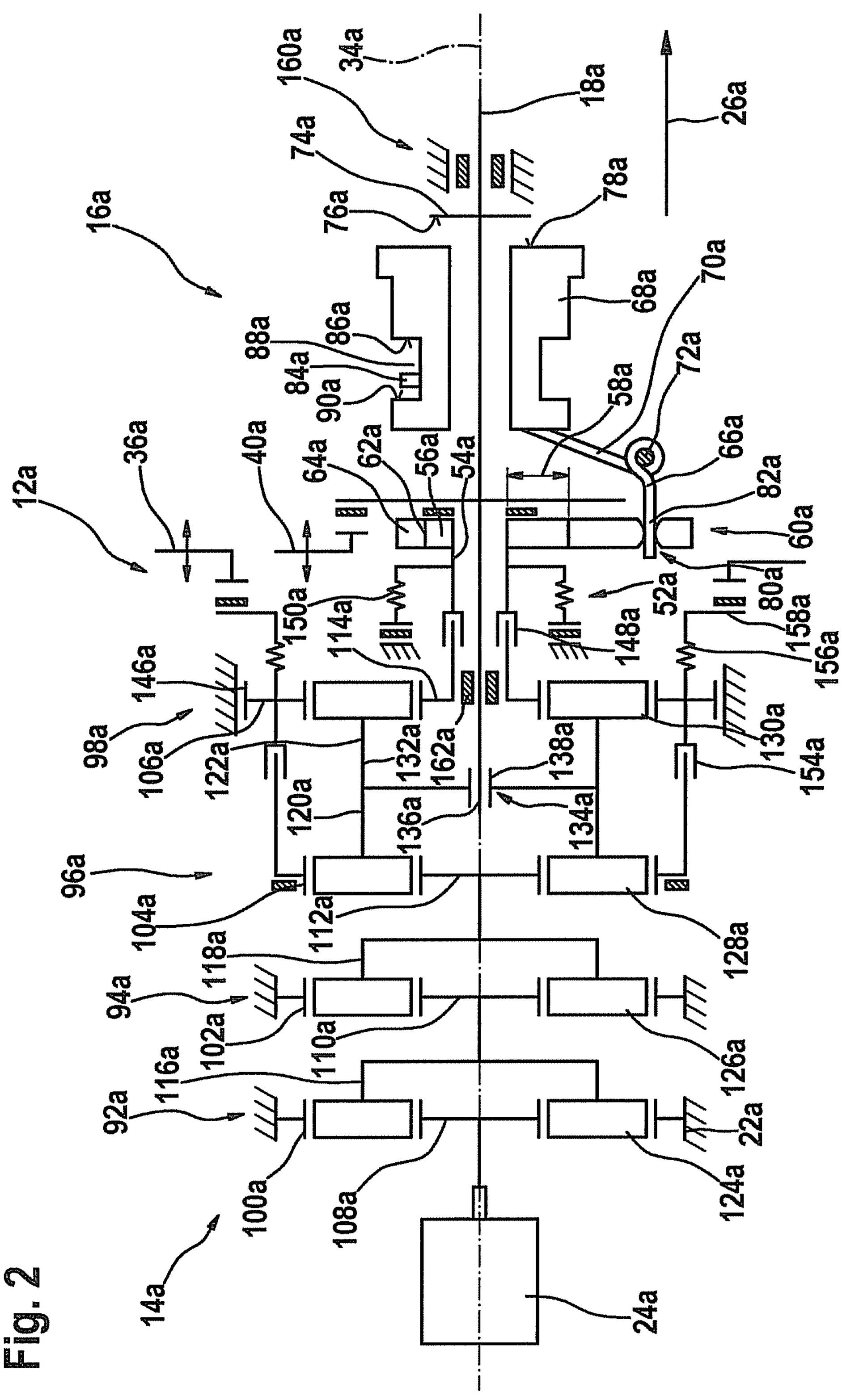
FIG. 2 is a functional sketch of the drivetrain of FIG. 1 having an electric motor, a gearbox assemblage, and a hammer impact mechanism.
Figure 3:
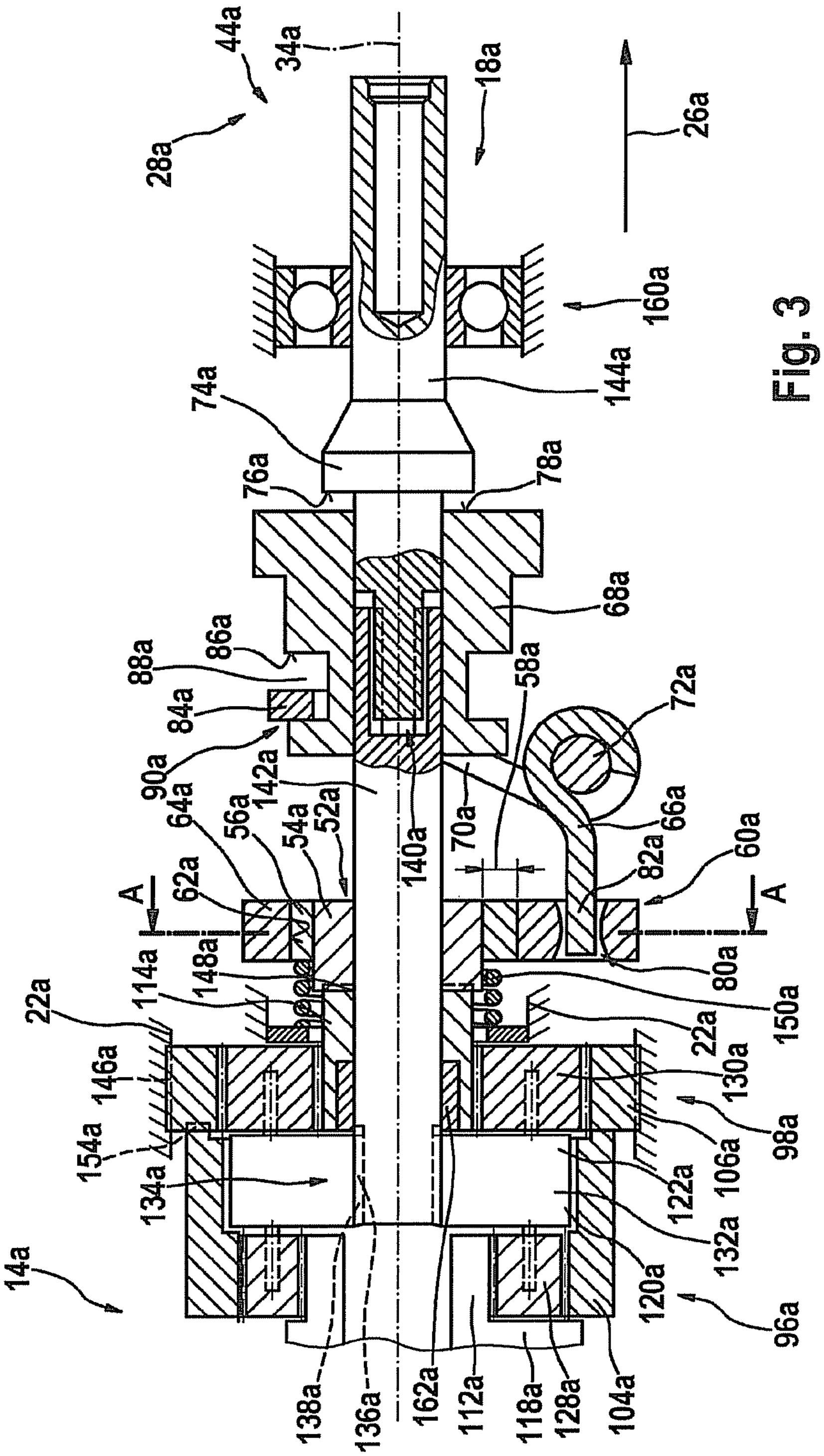
FIG. 3 is a schematic partial section through the hammer impact mechanism of the hand-held power tool of FIG. 1.

As FIGS. 2 and 3 show, hammer impact mechanism 16_a_ has a drive rotation element 52_a_ having a rotation axis 34_a_ that is disposed coaxially with respect to tool spindle 18_a_. Drive rotation element 52_a_ is arranged as an impact mechanism shaft 54_a_. Impact mechanism shaft 54_a_ encases a region of tool spindle 18_a_ that faces toward gearbox assemblage 14_a_. Rotation axis 34_a_ of impact mechanism shaft 54_a_ is oriented parallel to principal working direction 26_a_ of hand-held power tool 10_a_. Tool spindle 18_a_ connects tool mounting apparatus 30_a_ to gearbox assemblage 14_a_ along rotation axis 34_a_ nonrotatably, and is arranged for the most part as a solid shaft.

Figure 4:
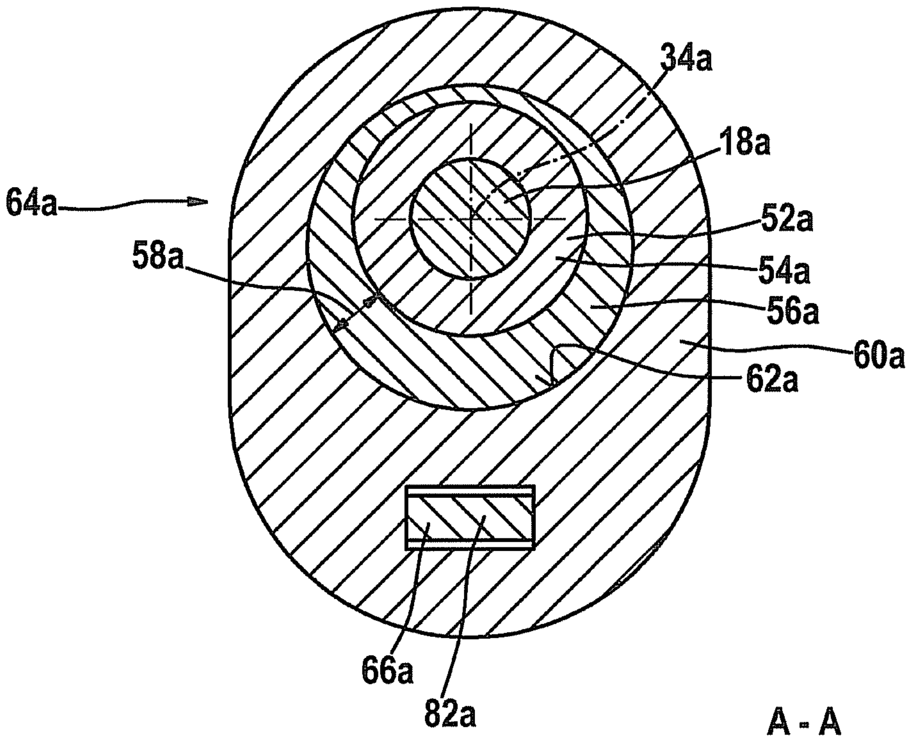
FIG. 4 is a section through the hammer impact mechanism of FIG. 3.

Hammer impact mechanism 16_a_ is arranged as an eccentric impact mechanism that has an eccentric element 56_a_. As shown by the section (A-A) depicted in FIG. 4, eccentric element 56_a_ has a rotation axis that coincides with rotation axis 34_a_ of tool spindle 18_a_. Eccentric element 56_a_ is constituted by a sleeve whose wall thickness 58_a_ continuously increases and then decreases over a 360-degree circuit around rotation axis 34_a_. Eccentric element 56_a_ is connected nonrotatably to impact mechanism shaft 54_a_, and is penetrated by the latter in an axial direction. Hammer impact mechanism 16_a_ has an eccentric outer element 60_a_ that is moved by eccentric element 56_a_ during a hammer drilling mode. Eccentric outer element 60_a_ is arranged as an approximately elliptical disk. It has a round orifice 62_a_ that is disposed in a region 64_a_, facing away from handle 48_a_, of eccentric outer element 60_a_. Eccentric element 56_a_ is supported in orifice 62_a_, movably relative to eccentric outer element 60_a_, by a bearing (not further depicted). Eccentric outer element 60_a_ further has an aperture 80_a_ that is disposed in a region, facing toward handle 48_a_, of eccentric outer element 60_a_. Aperture 80_a_ is penetrated by a resilient lever element 66_a_. Lever element 66_a_ prevents a rotation of eccentric outer element 60_a_ in a circumferential direction relative to hand-held power tool housing 22_a_.

Figure 5:
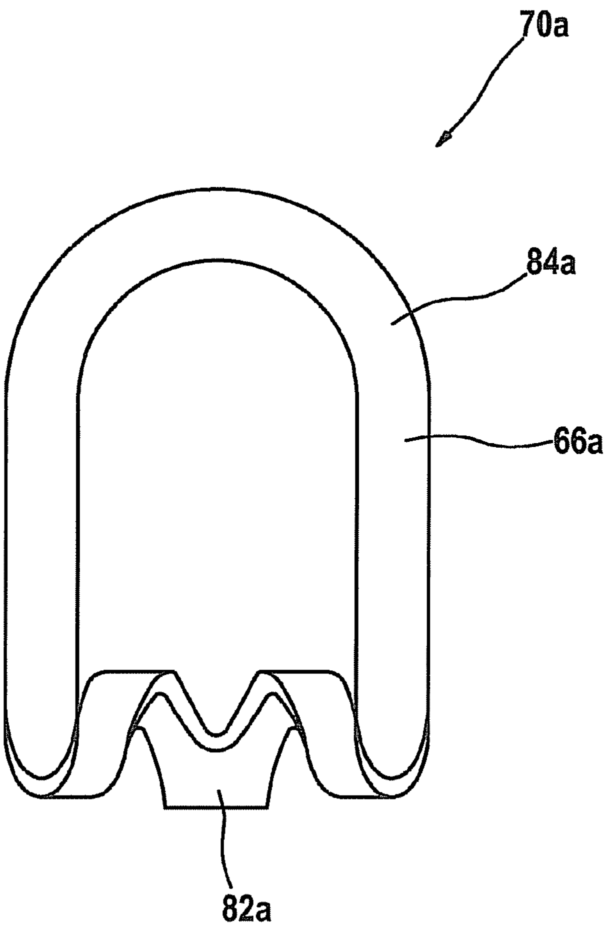
FIG. 5 is a perspective depiction of a lever element of the hammer impact mechanism of FIG. 3.

Hammer impact mechanism 16_a_ has a striker 68_a_. Lever element 66_a_ drives striker 68_a_ during a hammer drilling mode. Lever element 66_a_ is arranged as a bracket, L-shaped in a side view, made of spring steel. As FIG. 5 shows, lever element 66_a_ has a horseshoe-shaped region 70_a_ that is penetrated by tool spindle 18_a_. Hammer impact mechanism 16_a_ has a housing-mounted pivot shaft 72_a_ around which lever element 66_a_ is tiltable. Housing-mounted pivot shaft 72_a_ is oriented perpendicular to rotation axis 34_a_ of tool spindle 18_a_.

FIGS. 2 and 3 further show that striker 68_a_ of hammer impact mechanism 16_a_ is freely movable in principal working direction 26_a_ during a free-flight phase. The free-flight phase is a time period that begins with the end of an acceleration of striker 68_a_ by lever element 66_a_, and ends immediately before an impact. Upon impact, striker 68_a_ transfers an impact pulse to tool spindle 18_a_. For this, striker 68_a_ impacts a transfer element 74_a_ of tool spindle 18_a_. Transfer element 74_a_ is arranged as a thickening of tool spindle 18_a_ that has a surface 76_a_ on the side facing toward striker 68_a_. Surface 76_a_ is oriented parallel to an impact surface 78_a_ of striker 68_a_. Striker 68_a_ surrounds tool spindle 18_a_ over 360° in planes that are oriented perpendicular to rotation axis 34_a_ of tool spindle 18_a_. Striker 68_a_ is guided on tool spindle 18_a_ and is supported rotatably, with respect to hand-held power tool housing 22_a_, around rotation axis 34_a_ of tool spindle 18_a_. Alternatively, the striker can also be guided at its outer contour and/or can be rotationally secured with respect to the hand-held power tool housing.

Upon a rotation of eccentric element 56_a_, eccentric outer element 60_a_ moves perpendicular to rotation axis 34_a_ of tool spindle 18_a_. As a result of a motion of eccentric outer element 60_a_, an end 82_a_, disposed tiltably in aperture 80_a_ of eccentric outer element 60_a_, of lever element 66_a_ is moved, and lever element 66_a_ is thereby tilted. Lever element 66_a_ thereby accelerates striker 68_a_ out of an initial position, facing toward gearbox assemblage 14_a_, in the direction of principal working direction 26_a_, by the fact that a driving end 84_a_ of lever element 66_a_ presses against a first bracing surface 86_a_ of striker 68_a_. After acceleration, striker 68_a_ moves in principal working direction 26_a_ into the free-flight phase, in which driving end 84_a_ of lever element 66_a_ is disposed in a free region 88_a_ of striker 68_a_ and is thus decoupled from striker 68_a_ in principal working direction 26_a_. At the end of this free-flight phase, striker 68_a_ strikes transfer element 74_a_ of tool spindle 18_a_ and transfers its momentum to tool spindle 18_a_. Lever element 66_a_ then moves striker 68_a_ back into the initial position by the fact that driving end 84_a_ of lever element 66_a_ exerts a force on a second bracing surface 90_a_ of striker 68_a_, said surface being disposed, with reference to first bracing surface 86_a_, on a different side of free region 88_a_. As a result of the resilient configuration of lever element 66_a_, smooth profiles are achieved for the forces that act between lever element 66_a_ and striker 68_a_.

Gearbox assemblage 14_a_ has four gear stages, which are arranged as planet wheel gear stages 92_a_, 94_a_, 96_a_, 98_a_. The four planet wheel gear stages 92_a_, 94_a_, 96_a_, 98_a_ are disposed behind one another along rotation axis 34_a_ of tool spindle 18_a_. The four planet wheel stages 92_a_, 94_a_, 96_a_, 98_a_ each have a ring gear 100_a_, 102_a_, 104_a_, 106_a_, a sun gear 108_a_, 110_a_, 112_a_, 114_a_, a planet carrier 116_a_, 118_a_, 120_a_, 122_a_, and four planet wheels 124_a_, 126_a_, 128_a_, 130_a_, only two of which are depicted in each case. Planet wheels 124_a_ of first planet wheel gear stage 92_a_ mesh with sun gear 108_a_ of first planet wheel gear stage 92_a_ and with ring gear 100_a_ of first planet wheel gear stage 92_a_, and are supported rotatably on planet carrier 116_a_ of first planet wheel gear stage 92_a_. Planet carrier 116*a* of first planet wheel gear stage 92*a* guides planet wheels 124*a* of first planet wheel gear stage 92*a* on a circular path around rotation axis 34*a* of tool spindle 18*a*. Second planet wheel gear stage 94*a*, third planet wheel gear stage 96*a*, and fourth planet wheel gear stage 98*a* are constructed correspondingly thereto.

Sun gear 108*a* of first planet wheel gear stage 92*a* is connected nonrotatably to electric motor 24*a* and is disposed next to electric motor 24*a* in principal working direction 26*a*, between tool mounting apparatus 30*a* and electric motor 24*a*. Ring gear 100*a* of first planet wheel gear stage 92*a* is connected nonrotatably to hand-held power tool housing 22*a*. Planet carrier 116*a* of first planet wheel gear stage 92*a* is connected nonrotatably to sun gear 110*a* of second planet wheel gear stage 94*a*, ring gear 102*a* of which is likewise connected to hand-held power tool housing 22*a*. Planet carrier 118*a* of second planet wheel gear stage 94*a* is connected nonrotatably to sun gear 112*a* of third planet wheel gear stage 96*a*. Ring gear 104*a* of third planet wheel gear stage 96*a* is likewise connected nonrotatably to hand-held power tool housing 22*a* during a drilling, screwdriving, or hammer drilling procedure. The first, the second, and the third planet wheel gear stage 92*a*, 94*a*, 96*a* thus each bring about a gear reduction in the direction of tool mounting apparatus 30*a*. A gear reduction thus likewise occurs between sun gear 108*a* of first planet wheel gear stage 92*a* and planet carrier 120*a* of third planet wheel gear stage 96*a*. A ratio of this gear reduction between a rotation speed of electric motor 24*a* and a rotation speed of tool spindle 18*a* is equal to approximately 60:1.

In addition, one skilled in the art is familiar with possibilities for switching to an alternative conversion ratio between a rotation speed of electric motor 24*a* and a rotation speed of tool spindle 18*a*. For example, ring gear 102*a* of second planet wheel gear stage 94*a* can be nonrotatably connectable, alternatively to hand-held power tool housing 22*a*, to planet carrier 116*a* of first planet wheel gear stage 92*a* by way of a clutch apparatus (not further depicted). The alternative conversion ratio between the rotation speed of a motor speed and the rotation speed of tool spindle 18*a* is equal to approximately 15:1.

Gearbox assemblage 14*a* has a gear stage element 132*a* that splits a power flow. Gear stage element 132*a* is arranged as a common planet carrier 120*a*, 122*a* of the third and the fourth planet wheel gear stage 96*a*, 98*a*. Tool spindle 18*a* has a rotary entrainment contour 134*a* that creates, along rotation axis 34*a*, an axially displaceable and nonrotatable connection to gearbox assemblage 14*a*, more precisely to gear stage element 132*a*. A pickoff of a rotation speed of tool spindle 18*a* accordingly occurs at planet wheel 120*a* of third planet wheel gear stage 96*a*.

In this example, rotary entrainment contour 134*a* is arranged as an internal tooth set 136*a* of gear stage element 132*a* and an external tooth set 138*a* of tool spindle 18*a*. Alternatively, pickoff could occur at the ring gear of third planet wheel gear stage 96*a*.

Alternatively or in addition to rotary entrainment contour 134*a* shown in FIG. 2 and previously described, a rotary entrainment contour 140*a* can, as shown in FIG. 3, divide tool spindle 18*a* axially into two parts 142*a*, 144*a*. The one part 142*a* of tool spindle 18*a* is connected directly to gearbox assemblage 14*a*. The other part 144*a* of tool spindle 18*a* is connected directly to tool mounting apparatus 30*a*. The previously described rotary entrainment contour 134*a* can be omitted. Part 142*a* of tool spindle 18*a* that is connected directly to gearbox assemblage 14*a* can then be connected fixedly in an axial direction to gear stage element 132*a*. As a result, a mass of the axially movable part 144*a* of tool spindle 18*a* can be reduced.

Sun gear 114*a* of fourth planet wheel gear stage 98*a* is connected, during a hammer drilling mode, nonrotatably to drive rotation element 52*a*. Sun gear 114*a* of fourth planet wheel gear stage 98*a* is thus, in the context of a hammer drilling procedure, connected nonrotatably to eccentric element 56*a* of hammer impact mechanism 16*a*. Alternatively, ring gear 106*a* of fourth planet wheel gear stage 98*a* could also be connected nonrotatably to drive rotation element 52*a*.

Ring gear 106*a* of fourth planet wheel gear stage 98*a* is supported axially movably. Gearbox assemblage 14*a* has a coupling element 146*a* that connects ring gear 106*a* of fourth planet wheel gear stage 98*a* nonrotatably and axially displaceably to hand-held power tool housing 22*a*. As a result of this disposition, gearbox assemblage 14*a*—more precisely fourth planet wheel gear stage 98*a*—generates from the two power flows of the common planet carrier 120*a*, 122*a* of the third and the fourth planet wheel gear stage 96*a*, 98*a*, during a hammer drilling mode, output rotary motions that have a non-integer ratio to one another. In addition, fourth planet wheel gear stage 98*a* increases a rotation speed for an impact drive, i.e. a rotation speed of impact mechanism shaft 54*a* or of drive rotation element 52*a* is higher than a rotation speed of tool spindle 18*a*. Gearbox assemblage 14*a*—more precisely gear stage element 132*a*—thus makes available different rotation speeds for an impact drive and a rotary drive.

Hand-held power tool 10*a* has a first releasable clutch apparatus 148*a* that transfers a rotary motion during a hammer drilling mode. First clutch apparatus 148*a* is arranged as a claw clutch, and remains closed in the context of an axial motion of tool spindle 18*a* caused by an impact. In a hammer drilling mode, first clutch apparatus 148*a* connects hammer impact mechanism 16*a* to sun gear 114*a* of fourth planet wheel gear stage 98*a*.

First clutch apparatus 148*a* furthermore has a spring element 150*a* that is arranged as a spiral spring. Spring element 150*a* opens first clutch apparatus 148*a* when tool spindle 18*a* is unloaded oppositely to principal working direction 26*a*. In this case hammer impact mechanism 16*a* is deactivated. First clutch apparatus 148*a* is closed during a hammer drill mode by a force transferred via tool spindle 18*a* in an axial direction and proceeding from inserted tool 32*a*. When tool spindle 18*a* is loaded with a force, as a result of a force generated by the operator onto a workpiece (not further depicted) via an inserted tool 32*a* mounted in tool mounting apparatus 30*a*, spring element 150*a* is compressed and first clutch apparatus 148*a* is closed. The force is applied in an axial direction in the context of a hammer drilling mode, via a shaped element 152*a* that is connected to tool spindle 18*a*, onto impact mechanism shaft 54*a* and thus onto first clutch apparatus 148*a*.

In addition, hand-held power tool 10*a* has operating element 40*a* with which the operator can actuate first clutch apparatus 148*a* by uninterruptedly opening first clutch apparatus 148*a*. Hammer impact mechanism 16*a* is thus deactivated in this operating state. This operating element 40*a* thus enables a manual changeover between a drilling or screwdriving mode and a hammer drilling mode, and drilling and screwdriving can be performed with hand-held power tool 10*a* without an impact pulse. Operating element 40*a* is arranged as a slide switch.

Torque setting unit 12*a* has a clutch apparatus 154*a* that limits a transferable torque. A maximum torque is settable by way of torque setting unit 12*a*. This further, second clutch apparatus 154*a* is disposed between ring gear 104*a* of third planet wheel gear stage 96*a* and ring gear 106*a* of fourth planet wheel gear stage 98*a*. Second clutch apparatus 154*a* opens automatically at a settable maximum torque that acts on tool spindle 18*a*. When second clutch apparatus 154*a* is open, ring gear 104*a* of third planet wheel gear stage 96*a* is axially secured and rotationally movable. Second clutch apparatus 154*a* is arranged as an overload clutch, known to one skilled in the art, the response torque of which is modifiable by way of an axial force on second clutch apparatus 154*a*. For example, second clutch apparatus 154*a* is arranged as a shaped-element clutch having oblique surfaces, or as a friction clutch. Alternatively, ring gear 106*a* of fourth planet wheel gear stage 98*a* serves as a shaped element, by the fact that it meshes simultaneously with planet wheels 128*a*, 130*a* of third planet wheel gear stage 96*a* and of fourth planet wheel gear stage 98*a* and, when the maximum torque is exceeded, becomes displaced in principal working direction 26*a* and releases planet wheels 128*a* of third planet wheel gear stage 96*a*. For this purpose, ring gear 106*a* of fourth planet wheel gear stage 98*a* is preferably arranged to be wider than planet wheels 128*a*, 130*a* of the third and/or the fourth planet wheel gear stage 96*a*, 98*a*.

Hand-held power tool 10*a* has a spring element 156*a* that, during a working procedure, exerts a force on the axially movable ring gear 106*a* of fourth planet wheel gear stage 98*a* and thus on second clutch apparatus 154*a*, and thus closes second clutch apparatus 154*a*. By way of operating element 36*a* of torque setting unit 12*a*, second clutch apparatus 154*a* can be shifted by the operator, i.e. a force on the axially movable ring gear 106*a* can be set. This is done by way of an axial motion of a contact point 158*a* of spring element 156*a*.

When the maximum torque of tool spindle 18*a* is exceeded and clutch apparatus 154*a* is not uninterruptedly closed manually, second clutch apparatus 154*a* produces a counterforce and compresses spring element 156*a*, and clutch apparatus 154*a* opens. Operating element 36*a* of torque setting unit 12*a* is arranged as a ring rotatable by the operator.

Operating element 36*a* further has a shaped element (not further depicted) which is provided in order to manually close second clutch apparatus 154*a* uninterruptedly. This is done by a corresponding setting, by the operator, of operating element 36*a*. Opening of second clutch apparatus 154*a* in the context of a drilling mode can thereby be prevented at all torques that are transferred via tool spindle 18*a* and do not exceed a safety torque.

Gearbox assemblage 14*a* has two bearing elements 160*a*, 162*a* that radially support tool spindle 18*a*. First bearing element 160*a* is disposed on the side of tool spindle 18*a* facing toward tool mounting apparatus 30*a*. First bearing element 160*a* is connected axially fixedly to tool spindle 18*a*, and is supported axially displaceably in hand-held power tool housing 22*a*. Alternatively, the first bearing element can also be connected axially fixedly to the hand-held power tool housing, and supported axially displaceably on the tool spindle. Disposed on the side of tool spindle 18*a* facing away from tool mounting apparatus 30*a* is second bearing element 162*a*, which supports tool spindle 18*a* inside sun gear 114*a* of fourth planet wheel gear stage 98*a*. Alternatively, tool spindle 18*a* can be supported by the common planet carrier 120*a*, 122*a* of the third and the fourth planet wheel gear stage 96*a*, 98*a*.

Figure 6:
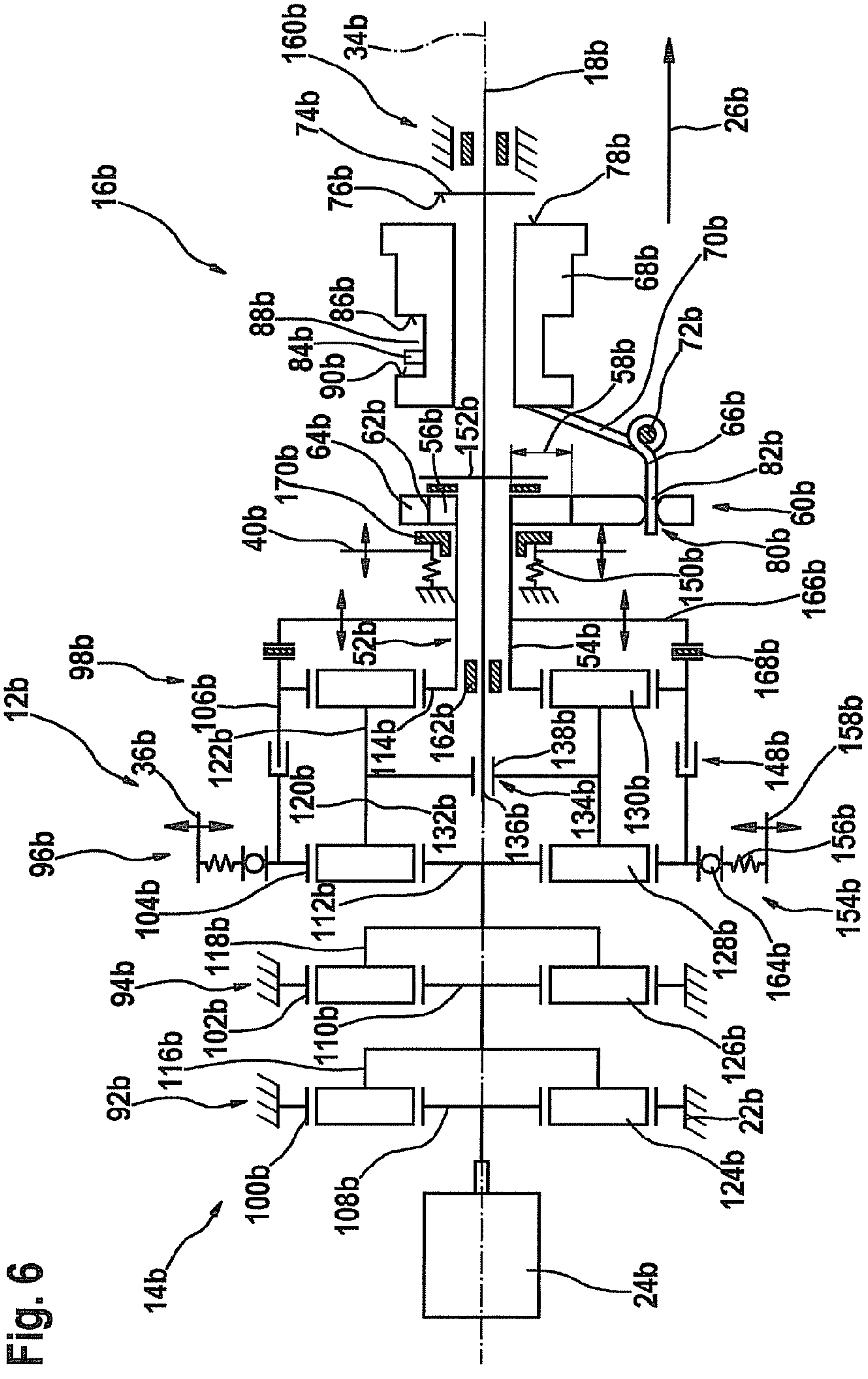
FIG. 6 is a functional sketch of an alternative exemplifying embodiment of the drivetrain of FIG. 1.

FIG. 6 shows a further exemplifying embodiment. To differentiate the exemplifying embodiments, the letter "a" in the reference characters of the exemplifying embodiment in FIGS. 1 to 5 is replaced by letters "b" in the reference characters of the exemplifying embodiment in FIG. 6. The description that follows is limited substantially to the differences with regard to the exemplifying embodiment in FIGS. 1 to 5; reference may be made to the description of the exemplifying embodiment in FIGS. 1 to 5 with regard to components, features and functions that remain the same. In particular, different dispositions and combinations of the above-described clutch apparatus are possible.

FIG. 6, like FIG. 2, shows in particular a torque setting unit 12*b*, a gearbox assemblage 14*b*, a hammer impact mechanism 16*b*, and a tool spindle 18*b*.

Torque setting unit 12*b* has latching elements 164*b* that are arranged as balls. Latching elements 164*b* are supported in shaped elements (not further depicted) and are disposed between a ring gear 104*b* of a third planet wheel gear stage 96*b* and a hand-held power tool housing 22*b*. Latching elements 164*b* are spring-loaded radially to a rotation axis 34*b* of tool spindle 18*b*, by a spring element 156*b* of torque setting unit 12*b*, with a force that is settable by the operator. If a torque transferred via tool spindle 18*b* exceeds a set maximum torque, latching elements 164*b* push the shaped elements apart against a force of spring element 156*b*. Ring gear 104*b* of third planet wheel gear stage 96*b* thus rotates relative to hand-held power tool housing 22*b*, and tool spindle 18*b* transfers no torque at that time.

Ring gear 104*b* of third planet wheel gear stage 96*b* and a ring gear 106*b* of a fourth planet wheel gear stage 98*b* are nonrotatably connected to one another by a clutch apparatus 148*b*. When clutch apparatus 148*b* is opened, ring gear 106*b* of fourth planet wheel gear stage 98*b* is freely rotatable around rotation axis 34*b*, and hammer impact mechanism 16*b* is thus disengaged for a drilling and screwdriving mode.

Clutch apparatus 148*b* is closed by two shaped elements 152*b*, 168*b*. First shaped element 152*b* transfers a force in an axial direction from tool spindle 18*b* onto an impact mechanism shaft 54*b*. This shaped element 152*b* is axially mechanically connected fixedly to tool spindle 18*b*.

Second shaped element 166*b* is connected in an axial direction to impact mechanism shaft 54*b*. Said element transfers force in an axial direction via a bearing 168*b* to ring gear 106*b* of fourth planet wheel gear stage 98*b*. The force closes clutch apparatus 148*b* in the context of a drilling and screwdriving mode. Alternatively, a transfer of force via fourth planet wheel gear stage 98*b* is possible. Clutch apparatus 148*b* is opened by a spring element 150*b* that applies axial force, directed onto a tool mounting apparatus 30*b*, onto impact mechanism shaft 54*b* via a bearing 170*b*.

What is claimed is:

1. A hand-held power tool, comprising:

a torque setting unit;

a gearbox assemblage;

a hammer impact mechanism; and a tool spindle configured to transfer a rotary motion to a tool mounting device;

wherein the hammer impact mechanism includes a drive rotation element having a rotation axis that is arranged coaxially with at least a part of the tool spindle, wherein the hammer impact mechanism includes a linearly moveable striker that in at least one operating state impacts a surface of the tool spindle linearly, and that partly coaxially surrounds the tool spindle in at least one plane, wherein the drive rotation element is arranged as an impact mechanism shaft that encases at least a region of the tool spindle and transfers a rotary motion to the striker to generate an impact.

2. The hand-held power tool according to claim 1, wherein the hand-held power tool is arranged as an impact drill driver.

3. The hand-held power tool according to claim 1, wherein the hammer impact mechanism includes an eccentric element.

4. The hand-held power tool according to claim 3, wherein the eccentric element includes a rotation axis that coincides with a rotation axis of the tool spindle.

5. The hand-held power tool according to claim 1, wherein the hammer impact mechanism has a resilient lever element, supported pivotably around a pivot axis, which is provided in order to drive a striker of the hammer impact mechanism in at least one operating state.

6. The hand-held power tool according to claim 1, wherein the hammer impact mechanism has a striker that, in at least one operating state, is freely movable in a principal working direction.

7. The hand-held power tool according to claim 1, wherein the gearbox assemblage includes at least one sun gear that, in at least one operating state, is connected nonrotatably to the drive rotation element.

8. The hand-held power tool according to claim 1, further comprising an electric motor and a battery connector unit adapted to supply the electric motor with energy.

9. The hand-held power tool according to claim 1, wherein the gearbox assemblage includes a gear stage that is arranged as a planet wheel gear stage.

10. The hand-held power tool according to claim 1, wherein the hammer impact mechanism includes a releasable clutch apparatus adapted to transfer rotary motion.

11. The hand-held power tool according to claim 10, wherein the clutch apparatus is adapted to be closed by a force transferred via the tool spindle.

12. The hand-held power tool according to claim 1, wherein the gearbox assemblage includes at least one gear stage element adapted to split a power flow so as to make available different rotation speeds for an impact mode and a rotation mode.

13. The hand-held power tool according to claim 1, wherein the gearbox assemblage is adapted to generate, in at least one operating state, at least two output rotary motions that have a non-integer ratio to one another.

14. The hand-held power tool according to claim 1, wherein the gearbox assemblage includes at least one ring gear supported axially movably.

15. The hand-held power tool according to claim 1, wherein in at least one operating state, the striker impacts a transfer element of the tool spindle linearly.

16. The hand-held power tool according to claim 1, wherein the striker has an impact surface that is oriented substantially perpendicular relative to the tool spindle and the transfer element has an impact surface that is oriented substantially perpendicular relative to the tool spindle, the impact surface of the striker and the impact surface of the transfer element are oriented substantially parallel to one another.

17. The hand-held power tool according to claim 1, wherein the tool spindle includes a rotary entrainment contour which is for creating an axially displaceable and nonrotatable connection with the gearbox assemblage along a rotation axis of the hand-held power tool for pickoff of a rotation speed of the tool spindle in at least one operating state.

18. The hand-held power tool according to claim 1, wherein the tool spindle and the impact mechanism shaft rotate, in at least one operating state, at a different angular speed.

19. A hand-held power tool, comprising:

a torque setting unit;

a gearbox assemblage;

a hammer impact mechanism; and a tool spindle;

wherein the hammer impact mechanism includes a drive rotation element having a rotation axis that is arranged coaxially with at least a part of the tool spindle, wherein the drive rotation element is arranged as an impact mechanism shaft that encases at least a region of the tool spindle, wherein the hammer impact mechanism is arranged as an eccentric impact mechanism that includes an eccentric element, wherein the eccentric element is:

comprised of a sleeve;

connected nonrotatably to the impact mechanism shaft;

configured to move an eccentric outer element of the hammer impact mechanism during a hammer drilling mode;

supported in an orifice of the eccentric outer element, which eccentric outer element is arranged as an approximately elliptical disk; and movable relative to the eccentric outer element by a bearing.

* * * * *